United States Patent [19]

Matsuda et al.

[11] 4,207,209
[45] Jun. 10, 1980

[54] SINTERED CATALTYIC OR ABSORBENT METALLIC PRODUCT AND METHOD FOR SINTERING METALLIC POWDERS

[75] Inventors: Shinpei Matsuda, Toukaimura; Youichi Sakuta, Sapporo; Tomoichi Kamo; Shigeo Uno, both of Hitachi; Masato Takeuchi, Katsuta; Jinichi Imahashi, Hitachi; Hideo Okada, Hitachi; Akira Kato, Hitachi; Fumito Nakajima, Hitachi, all of Japan

[73] Assignee: Hitachi, Ltd., Tokyo, Japan

[21] Appl. No.: 954,449

[22] Filed: Oct. 25, 1978

[30] Foreign Application Priority Data

Oct. 26, 1977 [JP] Japan ................. 52-127626
Mar. 1, 1978 [JP] Japan ................. 53-22045

[51] Int. Cl.$^2$ .................. B01J 21/06; B01J 23/28; B01J 23/88
[52] U.S. Cl. .................. 252/462; 252/469; 423/213.2; 423/213.5; 423/239; B01J/23/64
[58] Field of Search .................. 252/462, 469; 423/213.2, 213.5, 239

[56] References Cited

U.S. PATENT DOCUMENTS 3,900,429  8/1975  Komatsu et al. ................. 252/469 X
4,081,510  3/1978  Kato et al. ................. 252/469 X
4,085,193  4/1978  Nakajima et al. ................. 252/469 X

FOREIGN PATENT DOCUMENTS 49-88543  2/1976  Japan ................. 252/469

Primary Examiner—W. J. Shine
Attorney, Agent, or Firm—Thomas E. Beall, Jr.

[57] ABSTRACT

The present invention relates to a method for sintering oxidized titanium powder and an active metallic component containing oxidized molybdenum as a binder for oxidized titanium granules. The active metallic component comprises one or more than one selected from a group consisting of $V_2O_3$, $Fe_2O_3$, $WO_3$, $Co_2O_3$, $NiO$, $Cr_2O_3$, $CeO_2$, $SnO_2$, $CuO$, $MoO_3$, Pt, Pd, Rh, Ru, Ir and Re.

The method comprising the steps of:

depositing vaporized oxidized molybdenum on the oxidized titanium powder in an atmosphere of molybdenum vapor at temperatures of 460° to 650° C., forming a powdery mixture comprising the oxidized titanium powder with the deposited oxidized molybdenum and said active metallic component, adding water sufficient to make a viscous material of the powdery mixture, kneading the viscous material, shaping an article by using the viscous material, and calcining the article to produce a product.

24 Claims, 12 Drawing Figures

# SINTERED CATALTYIC OR ABSORBENT METALLIC PRODUCT AND METHOD FOR SINTERING METALLIC POWDERS

BACKGROUND OF THE INVENTION

The present invention relates to a method for sintering a mixture of oxidized titanium powder and an active metallic component, and to a product produced by the method.

Sintered products made by calcining the powdery mixture of oxidized titanium and metallic oxides have been utilized as a catalyst or adsorbing agent for effectively removing harmful materials from exhaust gases.

In a number of cases a dry type treatment using a catalyst or adsorbing agent has been employed for treating the gases containing harmful materials, for example, various kinds of exhaust combustion gases containing the nitrogen oxides like NO and $NO_2$ (described by NOx below) and the sulfur oxides (described by SOx below), exhaust gases from nitric acid plants, exhaust gases from iron producing plants, Claus tear gases containing many kinds of bad smelling materials like hydrogen sulfide, exhaust gases from paper manufacturing plants and other kinds of exhaust gases, because the treatment makes a process simpler and does not discharge a secondary waste.

When the dry type treatment is practiced, a static-bed reactor is generally employed by packing at random a catalyst or adsorbing agent in a shape of columnar, cylindrical, ringed, sherical or granular pellets. In these cases, a large amount of exhaust gases to be treated necessarily has required a larger size for a reactor packing the catalyst or adsorbing agent. Under such a condition, the catalyst or adsorbing agent is liable to be [given a] damaged by compression due to their own weight. Thus, sufficiently high mechanical strength has been required for the catalyst or adsorbing agent itself.

Many solid and misty materials are contained in the exhaust gases along with the harmful materials. For example, the exhaust combustion gas due to the chemical fuel such as coal, heavy petroleum and crude petroleum contains non-combustion materials like the oil smoke, an exhaust gas from a coke oven or a sintering oven contains a large amount of dust like heavy metals and ashes, and an exhaust gas from a glass dissolving furnace or a paper manufacturing plant contains a strong viscous mirabilite or alkali fume.

When such gases are fed to a static-bed reactor with the pellets, the deposits, e.g. the dust, increases a pressure loss in the reactor with the passage of time to deflect the flow of gas and to close the reactor in the worst case.

Thus, it can be provided to employ a process using a parallel flow type reactor, which is constructed to be small in pressure loss and small in size, with a catalyst of a honeycomb structure or plate structure having a base made from a metallic plate or wire net. However, there exists a technical problem on the shaping property and mechanical strength, when sintered products which can be used in either of the static-bed reactor or parallel flow type reactor are mainly made from powder of oxidized titanium. The sintered product which is used as a catalyst or adsorbing agent is required to have a sufficiently large specific surface area for best performance. The higher the calcining temperature is, the higher the strength of the catalyst or adsorbing agent, but the specific surface area becomes smaller, which gives rise to inferior performance. In order to improve the performance the calcining temperature is made lower, but this method results in decreasing not only the adhesive force of the catalyst of adsorbing agent against a base but also the mechanical strength. Further, in order to make a honeycomb type structure through a wet type method by using the oxidized titanium powder, this method requires a large amount of water to mix and knead the oxidized titanium powder to make a viscous material, which means not only a long time is required to remove the water contained, but also the mechanical strength becomes lower. If a large amount of water is used to shape an article or structure, a porous catalyst or adsorbing agent is completed when the water is removed, so that the adhesive force and the mechanical strength becomes lower.

Regarding the titanium system catalyst it has been proposed as described in U.S. Pat. No. 4,085,193 to Nakajima et al, to use a catalyst production method of making a mixture of titanium and molybdenum, molding the mixture in tablets and calcining the molded tablets in a muffle furnace at a temperature of 500° C. for four hours. The product is used for removing $NO_x$ from exhaust combustion gas. However, the patent does not disclose how to heighten the adhesive force as well as the mechanical strength of the catalyst or adsorbing agent.

SUMMARY OF THE INVENTION

It is therefore an object of the invention to provide a sintered product comprising the oxidized titanium and an active component, and a method to produce the product, which can provide the high mechanical strength and adhesive force.

It is another object of the invention to provide a sintered product comprising the oxidized titanium and an active component, and a method to produce the product, which can provide the strong combination between the titanium granules calcined.

It is another object of the invention to provide a sintered product comprising the oxidized titanium and an active component, and a method to produce the product, which can provide a binder strictly connecting the oxidized titanium granules.

It is another object of the invention to provide a method to produce a sintered product comprising the oxidized titanium and an active component, which has the improved shaping property to decrease an amount of water when a viscous material is made.

It is another object of the invention to provide a catalyst or adsorbing agent which can remove harmful materials from the exhaust gases.

In accordance with the present invention, there is provided a method for sintering oxidized titanium powder and an active component containing oxidized molybdenum as a binder for the oxidized titanium granules comprising the steps of:

depositing vaporized oxidized molybdenum on oxidized titanium powders in an atmosphere of molybdenum vapor at temperatures of 460° to 650° C., forming a powdery mixture comprising the oxidized titanium powder having the deposited oxidized molybdenum and the active component, adding water to the powdery mixture sufficient to make a viscous material, kneading the viscous material, shaping an article from the kneaded viscous material, and calcining the article to produce a product Further, in accordance with the present invention, there is provided a sintered product comprising:

31 to 99% by weight of oxidized titanium, 1 to 69% by weight of active component, the active component containing at least 1% by weight of oxidized molybdenum as a binder for oxidized titanium granules, and the oxidized molybdenum deposited on the oxidized titanium granules. The active component may comprise one or more than one selected from the group consisting of $V_2O_5$, $Fe_2O_3$, $WO_3$, $Co_2O_3$, NiO, $Cr_2O_3$, $CeO_2$, $SnO_2$, CuO, $MoO_3$, Pt, Pd, Rh, Ru, Ir and Re.

The inventors sought binders for the oxidized titanium granules to decrease an amount of water upon mixing and kneading of the oxidized titanium powder on addition of water, and to heighten the mechanical strength and adhesive force of the sintered product against the base. They tried organic binders such as methyl cellulose and polyvinyl alcohol. These organic binders not only increased the amount of water, but also decreased the mechanical strength of the sintered product produced. They also tried inorganic binders such as alumina and silica, and found these inorganic binders did not give rise to an effect to decrease the amount of water and gave a bad effect on the activity of the catalysts.

Finally they found the oxidized molybdenum gives rise to a desirable effect to combine the oxidized titanium granules.

According to the present invention, there are provided sintered products with a superior binder effect by a function of the oxidized molybdenum. Specifically describing, the mechanical strength or the destructive stress of a sintered product was 76 kg/cm$^2$ in a case where thee was no binder effect by the oxidized molybdenum, while stress was 224 kg/cm$^2$ in a case where there was the binder effect by the oxidized molybdenum. By depositing the oxidized molybdenum on the oxidized titanium granules, there is provided a mechanically strengthened sintered product which can be used in the parallel and static-bed type reactors as a catalyst or absorbing agent and can well endure the vibration, shock and friction during an operation.

When the mechanical strength of the catalyst or adsorbing agent is increased, an opening ratio of a section in a catalyst layer, which means a ratio of a gas flowing useful area against a cross-section area of the catalyst layer, can be made larger so that the reactors can stably treat a large amount of exhaust gas over prolonged periods of time without a large pressure loss, even though the gas contains a large amount of dust.

DETAILED DESCRIPTION OF THE DRAWINGS

Figure 1:
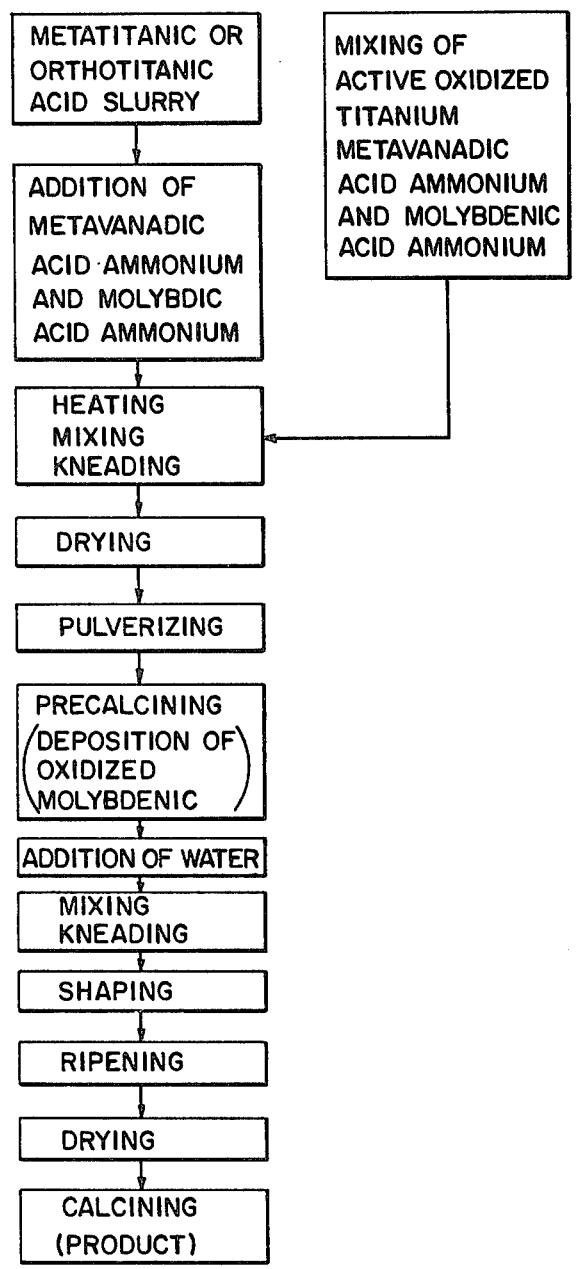
FIGS. 1 and 2 are block diagrams illustrating flows for sintering the oxidized titanium powder and active component according to the present invention.

As shown in FIG. 1, a slurry of metatitanic acid TiO (OH)$_2$ or Orthotitanic acid TiO (OH)$_4$ is formed, and metavanadic acid ammonium and molybdic aid ammonium are added to the slurry. These materials are mixed and kneaded until an amount of water becomes below 30% under heating. After that, the kneaded mixture is sufficiently dried at temperatures of more than 110° C., preferably from 110° to 180° C., and pulverized. A particle size of the mixture is different according to the following shaping method and generally desirable to be pulverized to powder in a particle size less than 60 mesh. The powder is heat-treated at temperatures of 460° to 650° C. for several hours for a precalcining process.

The precalcining process is to deposit the oxidized molybdenum on the oxidized titanium powders. The selection of the precalcining temperature is important to obtain a great performance as described below.

Instead of the metatitanic acid TiO (OH)$_2$ or orthotitanic acid TiO (OH)$_4$, active oxidized titanium TiO$_2$ may be used and, in this case, the oxidized titanium, metavanadic acid ammonium and molybdic acid ammonium are directly mixed. The mixture is kneaded under heating in the same way as described above.

The precalcined powders and correctly added water are mixed and kneaded to make a viscous material, which is used to shape required articles or structures and finally calcined through the steps of drying and calcining.

Figure 2:
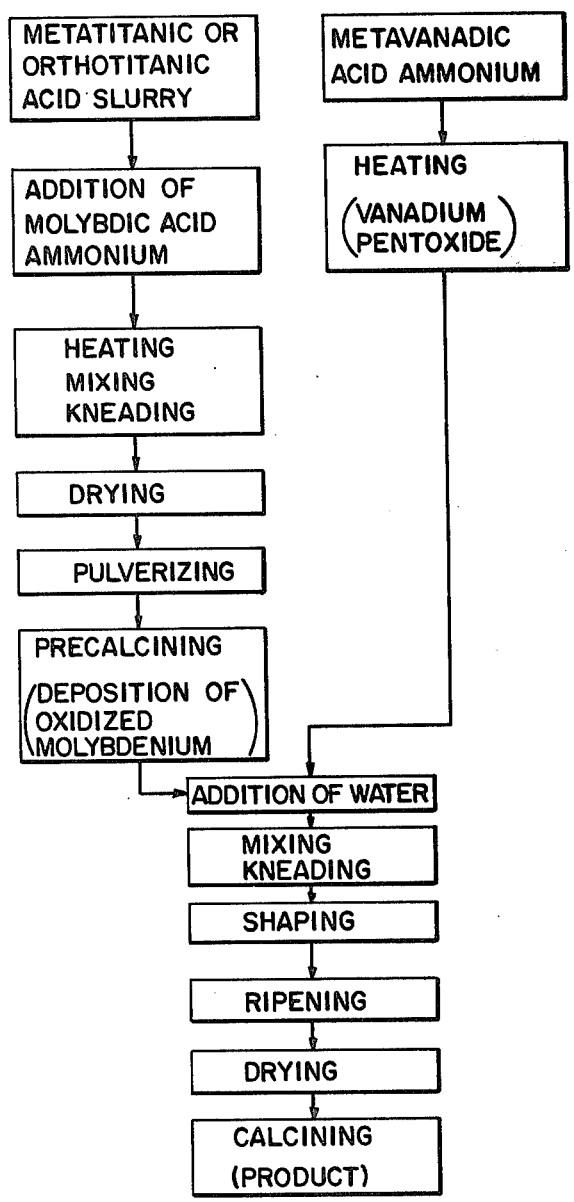

As shown in FIG. 2, instead of the above mentioned process, there can be employed another process which comprises the steps of adding molybdic acid ammonium to metatitanic or orthotitanic acid slurry, mixing and kneading the mixture under heating, drying the kneaded mixture so obtained, pulverizing the dried mixture to make a powdery mixture, heating metavanadic acid ammonium to form vanadium pentoxide, and mixing and kneading the powdery mixture so prepared and the vanadium pentoxide on addition of water to make a viscous material. The viscous material so obtained is shaped in an article or structure, dried and calcined in the same way as illustrated in FIG. 1.

Molybdate can be, after heating, added to the precalcined powdery mixture instead of said vanadium pentoxide according to purposes of the application.

The precalcined oxidized titanium powder includes 1 to 20% by weight of oxidized molybdenum and, when the granular size of the oxidized titanium is less than several μ, include 3 to 20% by weight. The precalcined powder in characterized in that the oxidized molybdenum is deposited thereon, forming the layer thickness more than several ten to several hundred Å. Owing to the presence of the layer the spaces between the titanium granules are, when calcined, made smaller, so that the mechanically strongly sintered product is obtained. As seen in the prior art when the oxidized titanium powder and the oxidized molybdenum powders are merely mixed and calcined without the precalcining process to deposit the oxidized molybdenum on the oxidized titanium powders, in the obtained product the oxidized titanium granules and the oxidized molybdenum granules are individually present. Such an oxidized molybdenum does not have a binder effect. On the contrary, as mentioned above according to the present invention, the surface of the oxidized titanium granules especially the convex portions thereof, is coated so as to make smaller the spaces between the oxidized titanium granules when they are finally calcined. In the invention the oxidized titanium powder is treated in a high vapor pressure atmosphere of molybdenum such as about $10^{-6} \sim 10^{-4}$ atm in a specified temperature range. The oxidized titanium powder treated in the atmosphere of molybdenum can be mixed and kneaded by adding a small amount of water thereto, so that the oxidized molybdenum is deposited on the powder. Thus, the viscous material so produced by mixing and kneading on addition of the small amount of water is shaped, dried and calcined to produce a final product with the high density and high strength without the reduction of the specific surface area. The concrete treatment of the oxidized titanium powder for precalcining is made by heating the mixture of the oxidized titanium powder or the titanic compound which can form the oxidized titanium through a heat treatment together with the oxidized molybdenum or the molybdic compound which can form the oxidized molybdenum in a closed container under heating, at which it is necessary to be at temperatures of 460° to 650° C., preferably 500° to 610° C. for 2 to 10 hours.

As another treatment of the oxidized titanium powder, there is provided a method to pass the oxidized titanium powder in an oven with a temperature gradient to which vaporized oxidized molybdenum is introduced to deposit on the oxidized titanium powder. An amount of oxidized molybdenum to be deposited on the oxidized titanium powder is, when the oxidized molybdenum is calcined as molybdenum trioxide $MoO_3$, 1 to 20% by weight, preferably 3 to 20% by weight based on the finally calcined product weight. When the oxidized molybdenum is useful as an active component of a catalyst or adsorbing agent, a further amount of molybdenum can be contained. The amount of molybdenum is desirable to be less than 49% by weight as an active component. When the molybdenum is used 20% by weight as a binder, molybdenum is totally used up to 69% by weight. Thus, the amount of the oxidized titanium is used in the extent of 31 to 99% by weight and preferably in the extent of 50 to 99% by weight. The oxidized titanium powder on which the oxidized molybdenum is deposited becomes viscous by mixing and kneading on addition of water, and the produced viscous material can be easily formed in a pellet shape or spread on structures such as porous plates and metalic wire nets. The most suitable amount of water to be added is 20 to 30% by weight for a purpose that the viscous material is shaped in honeycomb structures, 20 to 30% by weight for a purpose that the viscous material is spread on metallic wire nets, 25 to 35% by weight for a purpose that the viscous material is spread or plates and 13 to 30% by weight for a purpose that the viscous material is formed in a shape of pellet. Thus, the amount of water would comprise 13-35% by weight.

The oxidized titanium powder becomes viscous on addition of such an extremely small amount of water. This depends on the fact that the oxidized titanium powder with the oxidized molybdenum can form a capillary region on addition of such an extremely small amount of water. This is a reason why the oxidized molybdenum is deposited on the oxidized titanium powder by repeating the vaporization and condensation of the oxidized molybdenum.

As a raw material of the oxidized titanium, the anatase type or rutil type oxidized titanium and the titanic compounds such as orthotitanic acid and metatitanic acid which can form the oxidized titanium through a heat treatment can be used. As a raw material of the oxidized molybdenum, the oxidized molybdenum and the molybdic compounds such as molybdic acid and molybdic acid ammonium which can form the oxidized molybdenum through a heat treatment can be used. When the oxidized titanium powders and oxidized molybdenum powders are used as a raw material, they are uniformly mixed and kneaded by a kneader on addition of 30 to 60% by weight of water and introduced to a precalcining process.

Although the granular size of the powder on precalcining is not limitative, it is desirable to form the granular size prior to the mixing and kneading process after the precalcining process. It is desirable to be within a size that 80% of the powder passes a 50 mesh sieve.

The precalcining treatment may be made in an atmosphere of usual air in a gas oven or an electric oven and preferably should be made in a closed container in the above mentioned temperature range.

Figure 3:
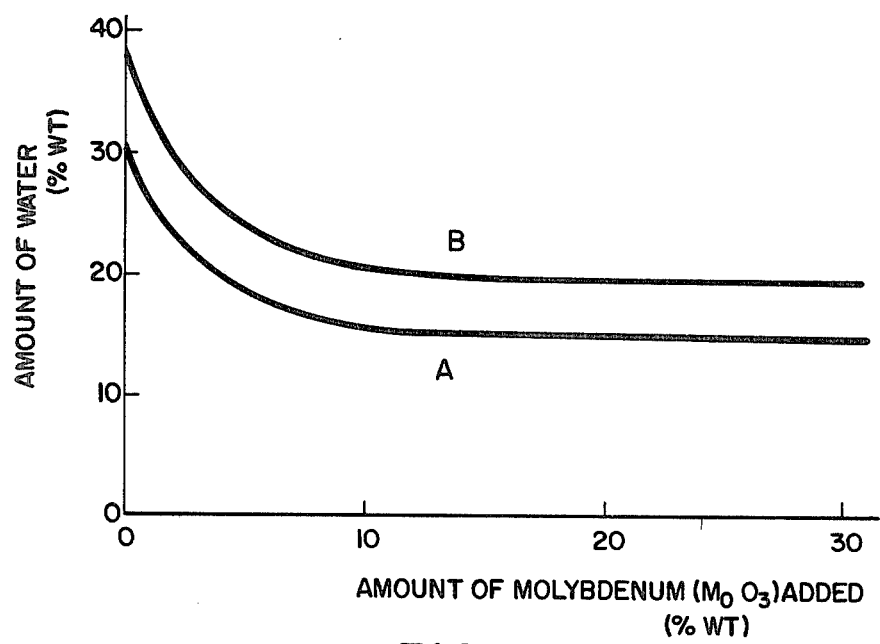
FIG. 3 is a characteristic graph illustrating a relationship between the amount of oxidized molybdenum added and the amount of water to be added.

In FIG. 3, curve A illustrates the relationships between the amount of oxidized molybdenum to be added and the most suitable amount of water to be added on shaping a honeycomb structure by using the viscous material. The same relationship is illustrated by curve B for spreading the viscous material on a metallic wire net. The curve A represents the actually measured values in a case that a honeycomb structure was shaped with the full square cross-section of 43 mm a side and with 49 units, each of which is square with a 5 mm opening for each side. The curve B represents the actually measured values in a case that the viscous material was spreaded on a metallic wire net made of SUS 304 in a size of 45 mesh. It is easily understandable that in both cases the most suitable amount of water is extremely less than the required amount of water using the prior art without oxidized molybdenum. When the additional amount of oxidized molybdenum is less than 1% by weight, the binder effect is not much and when the additional amount of oxidized molybdenum exceeds 20% by weight, the binder effect is saturated. Thus, it is not recommended to add the oxidized molybdenum over 20% by weight as a binder for the titanium granules.

Figure 4:
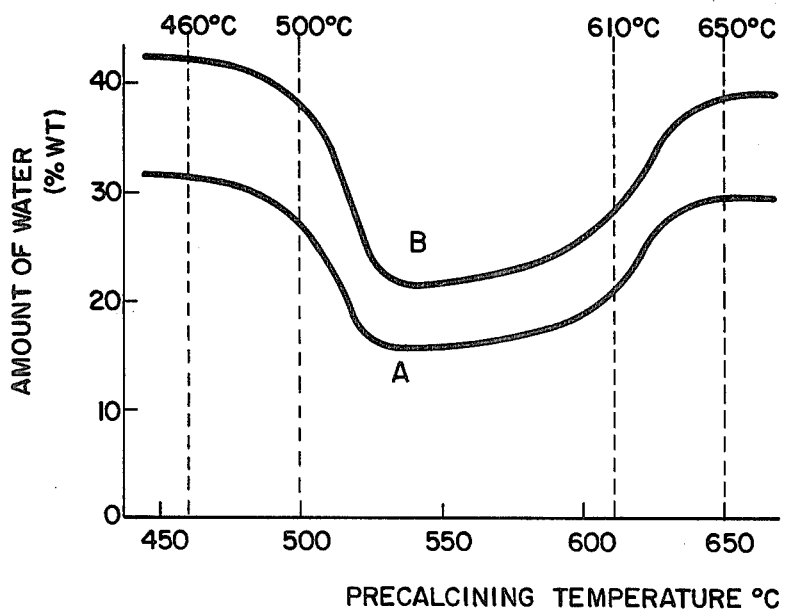
FIG. 4 is a characteristic graph illustrating a relationship between precalcining temperatures and the amount of water to be added.

FIG. 4 relates to the relationships between the most suitable amount of water to be added and precalcining temperatures in a case that 10% by weight of the oxidized molybdenum is added to the oxidized titanium powders as a binder. In the figure, curves A and B correspond to curves A & B shown in FIG. 3. The amount of water indicates a perforance of the sintered products. The less the additional amount of water is, the stronger the sintered products become mechanically. As can be seen in FIG. 4, the precalcining temperatures are suitable in the range of 460° to 650° C. and preferably the range of 500° to 610° C. The tendency of the curves does not change, even though the amount of the oxidized molybdenum is increased or decreased to the extent of 1% to 49% by weight.

When a transition metallic oxide is added to a catalyst or adsorbing agent to form a composition comprising three components, for example $TiO_2.V_2O_5.MoO_3$ and $TiO_2.Fe_2O_3.MoO_3$, crystals of $TiO_2$ are developed, so that the reduction of activity as a catalyst or adsorbing agent occurs above 610° C.

Further, upon addition of the oxidized molybdenum a large amount of the oxidized molybdenum is discharged out of a system due to the high vapor pressure above 610° C. Thus, it is advantage to carry out the precalcining process below 610° C. from the viewpoint of the cost of production.

Figure 5:
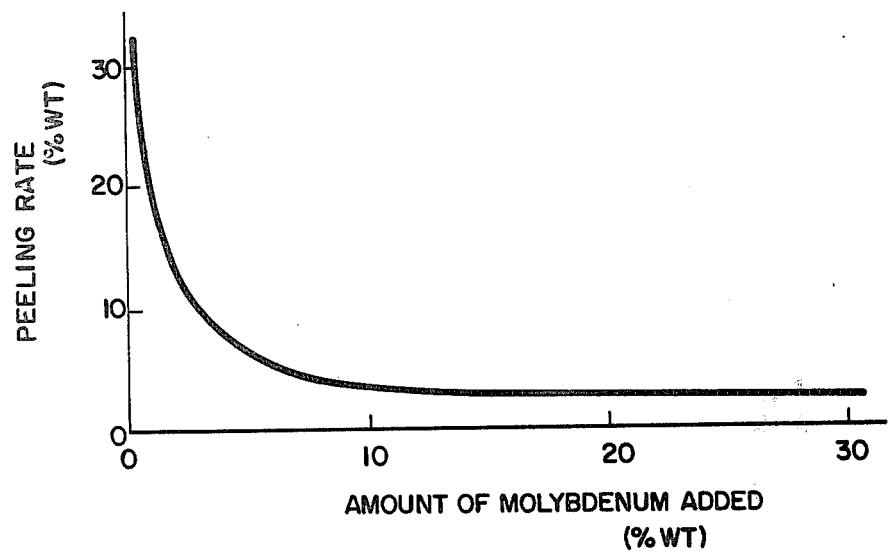
FIG. 5 is a characteristic graph illustrating a relationship between the amount of oxidized molybdenum added and a peeling rate.

FIG. 5 represents the relationship between the amount of oxidized molybdenum to be added and the peeling rate (percentage) of the sintered body which is shaped by spreading the viscous material on a metallic wire net and calcining at a temperature of 500° C. The peeling rate was obtained by a peeling test, which is a testing method to examine a peeling amount of catalyst or other layers by putting a cellophane tape on a part of the sintered body and removing the tape to compare the sintered parts covered with the tape and without the tape. As shown in FIG. 4, with the increase of the amount of oxidized molybdenum the combining force in the sintered body is progressively increased due to the increasing binder effect. However, even if the amount of oxidized molybdenum is increased above 20% by weight, the binder effect is not improved any more.

The sintered products comprising the oxidized titanium and the active components containing the oxidized molybdenum which is deposited on the oxidized titanium granules are utilized with the following catalysts or adsorbing agent:

A catalyst for removing the NOx from various gases, comprising an active component selected from $V_2O_3$, $Fe_2O_3$, $WO_3$, $Co_2O_3$, NiO, $Cr_2O_3$, $CeO_2$, $SnO_2$, CuO and $MoO_3$;

A catalyst for removing the carbided oxides such as carbon monoxide and carbon dioxide from exhausted gases from automobiles and exhaust combustion gases, comprising an active component selected from Pt, Pd, Rh, Ru, Ir and Re;

A catalyst for oxidizing hydrogen sulfide in a gas, comprising an active component selected from $V_2O_3$, $Fe_2O_3$, $WO_3$ and $MoO_3$;

A catalyst for removing the sulfur oxides from various exhaust combustion gases, comprising an active component selected from $Fe_2O_3$ and CuO; and An adsorbing agent for adsorbing and removing hydrogen sulfide from exhaust gas, comprising the oxidized molybdenum of 10 to 50% by weight as an active component containing a binder effect.

Figure 6:
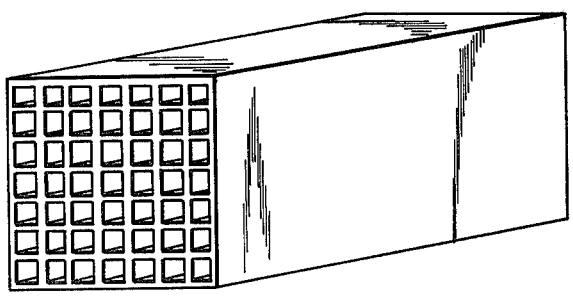
FIG. 6 is a perspective view of a honeycomb structure illustrating one embodiment according to the present invention.

As shown in FIG. 6, a honeycomb structure is shaped by extruding the viscous material formed by adding 20 to 30% by weight of water to the mixture of the oxidized titanium powder with the oxidized molybdenum and the active component powder.

Figure 7:
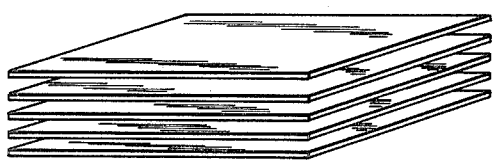
FIGS. 7 to 11 are perspective views of plate structures illustrating other embodiments according to the present invention.
Figure 8:
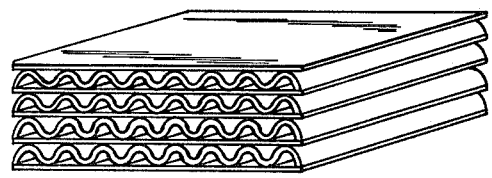
Figure 9:
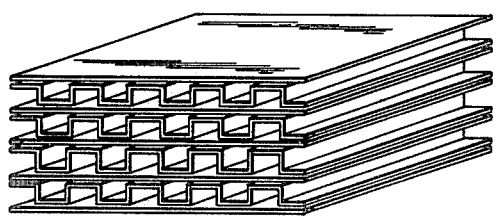
Figure 10:
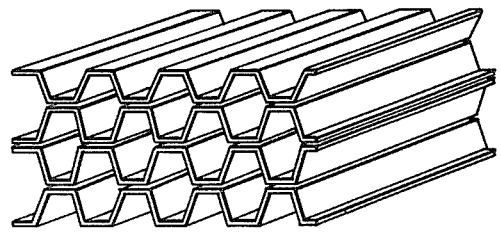
Figure 11:
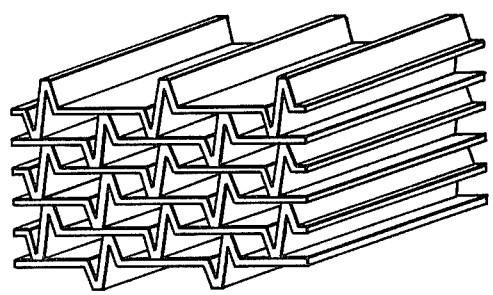

As shown in FIG. 7, a plate structure is shaped by spreading the viscous material formed by adding 25~35% preferably 24~28% by weight of water on a porous stainless steel plate.

As shown in FIGS. 8 to 11, other plate structures are also shaped by spreading the viscous material formed by adding 20 to 30% by weight of water on various metallic wire nets.

Figure 12:
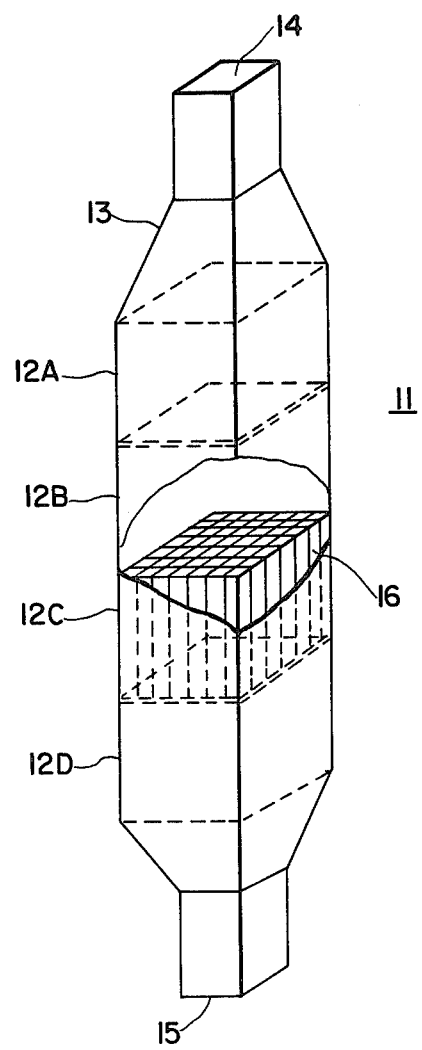
FIG. 12 is a perspective view of a catalyst reactor piling up four units according to the present invention.

As shown in FIG. 12, a parallel type reactor is constructed by using a plurality of honeycomb structures or plate structures. To make easier the examination, repairs, exchange and regeneration of a device, it is desirable to make a unit by using a plurality of honeycomb structures or plate structures and to pile up several units to construct the final parallel type reactor which has a specified capacity. Especially such a device is useful to treat a large amount of exhaust gas. It is also possible to form the plate structures in various shapes, for example in a waving or rolling shape, by spreading the viscous material on bases with various shapes. Thus, many reactors with various shapes can be manufactured.

A parallel type reactor is preferably provided with many gas passages, one of which is with a cross-section area of 4 to 400 mm$^2$. When the area is below 4 mm$^2$, a pressure loss becomes larger in the reactor, so that it is not suitable to treat an exhaust gas containing a large amount of dust. When the area exceeds 400 mm$^2$, it is impossible to form a large geometrical surface of a catalyst per a cubic volume of the catalyst, so that a great performance for removing harmful materials is not effected and results in making the reactor larger.

Table I shows the compression fracture strength of honeycomb structures and sintered pellets finally calcined with and without the precalcining process.

Table I

| Shape Structure | Honeycomb in Diameter (kg/cm$^2$) | | columnar Pellet of 9 mm (kg/pellet) | |
| --- | --- | --- | --- | --- |
| MoO$_3$ (% wt) Composition (Atomic Ratio) | 0 | 8.6 | 0 | 8.6 |
| Ti - V    94:6 | 76 | 224 | 28 | 95 |
| Ti - Fe   9:1 | 82 | 256 | 31 | 106 |
| Ti - W    9:1 | — | — | 21 | 88 |
| Ti - Cu   9:1 | — | — | 25 | 92 |
| Ti - Ni   9:1 | — | — | 18 | 88 |
| Ti - Pt   98:2 | — | — | 23 | 75 |

Table II shows the peeling rates of catalyst plates according to the results of a peeling test in the same way as in Table I.

Table II

| | Base | | | |
| --- | --- | --- | --- | --- |
| | 45 Mesh Wire Net (% wt) | | Stainless Stell Plate (% wt) | |
| Composition (Atomic Ratio) | MoO$_3$ (% wt) | | | |
| | 0 | 5 | 0 | 5 |
| Ti - V    94:6 | 72 | 0.5 | 76 | 0.5 |
| Ti - Fe   95:5 | 66 | 0.5 | 73 | 0.6 |
| Ti - W    95:5 | 71 | 0.5 | 75 | 0.5 |
| Ti - Cu   95:5 | 68 | 0.3 | 69 | 0.5 |

Table III shows the peeling rate of catalyst plates according to the results of 1 m fall test in the same way as in Table I. Test pieces were in a size of 400 mm × 200 m × 1 mm in height.

Table III

| Base | 45 Mesh Wire Net (% wt) | | Stainess Steel Plate (% wt) | |
| --- | --- | --- | --- | --- |
| MoO$_3$ (% wt) Composition (Atomic Ratio) | 0 | 5 | 0 | 5 |
| Ti - V    94:6 | 31 | <0.1 | 38 | <0.1 |
| Ti - Fe   95:5 | 28 | <0.1 | 35 | <0.1 |

Table III-continued

| Base | | 45 Mesh Wire Net (% wt) | | Stainess Steel Plate (% wt) | |
|---|---|---|---|---|---|
| MoO$_3$ (% wt) Composition (Atomic Ratio) | | 0 | 5 | 0 | 5 |
| Ti - W | 95:5 | 33 | <0.1 | 37 | <0.1 |
| Ti - Cu | 95:5 | 25 | <0.1 | 38 | <0.1 |

The following Examples illustrate the present invention in greater detail.

EXAMPLE 1

Metatitanic acid slurry 10 kg (calculated as having 40% by weight of oxidized titanium TiO$_2$ based on the total weight of the produced product), metavanadic acid ammonium 395 g and ammonium molybdate 496 g (calculated as having 8.6% by weight of oxidized molybdenum MoO$_3$ based on the total weight of the produced product) were sufficiently well mixed and kneaded by a kneader. After that, the contents were taken out and dryed in an oven at a temperature of 140° C. Then, the contents were pulverized to a granular size less than 60 mesh by a pulverizer and the produced powder was heat-treated at a temperature of 530° C. for four hours. Afterward 80% by weight of raw powder so obtained, 2% by weight of "Avicel" and 17% by weight of water were mixed and kneaded by a kneader to obtain a viscous material.

The viscous material was formed by a vacuum extruding machine in a shape of honeycomb structure with a cross-section of a regular square. The structure was dried and sintered at a temperature of 500° C. for two hours, so that a honeycomb structure with the sintered body was obtained. The structure had the full cross-section of a 43 mm side in a regular square and 49 units each of which is provided with a tubular opening of a 5 mm side in a regular square and with a 1 mm wall thickness.

The mechanical strength of the structure was 224 kg/cm$^2$ in a direction of the cross-section.

For comparison, 68% by weight of raw powder made similarly to the example except for the addition of the oxidized molybdenum was mixed with 2% by weight of "Avicel," and well mixed and kneaded on addition of 30% by weight water. A honeycomb structure with a sintered body was made in a same way as in the Example. The mechanical strength of the structure was 76 kg/cm$^2$ in a direction of the cross-section.

As can be seen in the Example, the mechanical strength of the structure containing the binder was more three times stronger than the structure which did not have the binder and represented a strong combining force for the titanium granules.

It is clear the structure was extremely useful as a catalyst.

EXAMPLE 2

A reactor unit was constructed by arranging 36 structures of FIG. 6 obtained in Example 1, in a square of seven rows of seven structures in each row. The length of the unit was 150 mm. As shown in FIG. 12, a full catalyst reactor 11 was constructed by piling up four such units 12A, 12B, 12C and 12D in a container 13 with an exhaust gas inlet 14 and an exhaust gas outlet 15. As above mentioned the unit comprises the 36 honeycomb structures 16. An exhaust gas 300 Nm$^3$/h (Space velocity SV ≈ 7500 h$^{-1}$) of the following components from a sole coal combustion type boiler was fed to the catalytic reactor 11 for removing the NOx from the gas by injecting ammonia under a reactor condition of NH$_3$/NO=1.1 and a reaction temperature of 350° C.:

NOx ≈ 3,000 PPm
SOx ≈ 1,300 PPm
O$_2$ ≈ 4%
CO$_2$ ≈ 15%
H$_2$O ≈ 8%
N$_2$: Balance
Dust density ≈ 22 g/Nm$^3$ As a result, the initial removing rate of NOx was about 85% and a pressure loss in the catalystic reactor was 36 mm Aq, and after 1,000 hours the removing rate was 84% and the pressure loss was 43 mm Aq.

It became apparent that there is no problem as a catalyst reactor because the removing rate of NOx and the pressure loss barely changed over prolonged periods of time.

EXAMPLE 3

Metatitanic acid slurry 1,000 g (calculated as having 35% by weight of oxidized titanium based upon the total weight of the produced product, metavanadic acid ammonium NH$_4$VO$_2$ 27.5 g and ammonium molybdate (NH$_4$)$_6$ Mo$_7$O$_{24}$ 0.4H$_2$O 70.8 g were sufficiently well mixed and kneaded by a kneader for two hours. After that, the contents were dried at a temperature of 150° C. for five hours and pulverized to a granular size that 90% of the powder passed through a 60 mesh sieve. The mixture of powder was precalcined to deposit the oxidized molybdenum on the oxidized titanium powders at a temperature of 530° C. for three hours, and mixed and kneaded by a kneader for two hours on addition of 20% by weight of water to obtain a paste-like viscous material. A part of the viscous material was spreaded on a metallic wire net of a 45 mesh in a size of 200 mm × 1,000 mm. The wire net with a surplus spread viscous material had been passed through a scraper with a space of 0.4 mm which was formed by two stainless steel plates with a cutter at the contacting part with the wire net and arranged in a slit to take off the surplus viscous material from the wire net. The wire net with the viscous material so correctly spread was statically placed at a room temperature for 10 to 20 minutes and pressed by a roller mill which coated with Teflon. A structure so shaped was dried at a temperature of 150° C. for three hours and finally calcined at a temperature of 450° C. for two hours. The calcined product contained titanium Ti, vanadium V and molybdenum in an atomic ratio of 87:6:7. The thickness of the produced plate was 0.5 mm. The plate was cut in a size of 50 mm × 50 mm and made a test piece. A result of a peeling test demonstrated that a peeling rate was 0.9%. Also, according to a result of a falling test from a 1 m in height, the peeling rate was less than 0.5%.

EXAMPLE 4

Oxidized titanium 1.5 kg, metavanadic acid ammonium 116 g and molybdic acid ammonium 624 g (calculated as having 10% weight of MoO$_3$ based on the total weight of the product) were sufficiently well mixed and kneaded by a kneader on addition of water 2 l, and dried at a temperature of 150° C. and calcined at a temperature of 530° C. for two hours to make powder. The powder was added to water, and mixed and kneaded by a kneader under heating. The water was reduced to 22% by weight and a viscous material was obtained. The viscous material was spread on porous stainless steel plates and dried by a wind for a day and at a temperature of 120° C. for five hours. Finally a calcining process was made at a temperature of 500° C. for two hours.

In order to evaluate the adhesive performance of the sintered product, a peeling test was made.

According to a result of the test, the peeling rate was 0.5% by weight.

EXAMPLE 5

The viscous material which was obtained in Example 4 was spreaded on a stainless steel wire net in a size of 255 mm×400 mm and pressed by a rolling mill coated with Teflon. The obtained structure was dried and finally calcined at a temperature of 530° C. for two hours. As a result, catalyst plates were obtained. A plate thickness was almost 0.5 mm. The catalyst plates were in turn arranged in a distance of 6 mm to construct a reactor unit in a size of a 252 mm side in a regular square and 400 mm in length.

A whole catalyst reactor was constructed by piling up four of these. An opening ratio of the reactor was 95%. Further, the total weight of the plates was almost 13 kg, which was almost 1/10 in comparison with that made from prior catalyst pellets. Also, the amount of catalyst was reduced to almost 1/25 comparing with a case that conventional catalyst pellets were used.

An exhaust gas 1,000 Nm$^3$/h (SV$\approx$1,000 h$^{-1}$) of the following components from a sole coal combustion type boiler was fed to the catalyst reactor for removing the NOx from the gas by injecting ammonia under a condition of NH$_3$/NO=1.1 and a reaction temperature of 350° C.:

NOx$\approx$3,000 PPm
SOx$\approx$1,300 PPm
O$_2\approx$4%
CO$_2\approx$15%
H$_2$O$\approx$8%
N$_2$: Balance
Dust density$\approx$22 g/Nm$^3$ As a result, the initial removing rate of NOx was about 89% and a pressure loss in the catalyst reactor was 18 mm Aq, and after 1,000 hours the removing rate was about 87% and the pressure loss was 23 mm Aq.

It became apparent that there is no problem using the catalyst, because the removing rate and the pressure loss did not change much over prolonged periods of time. Further, the catalyst was not poisoned by the SOx in the gas and demonstrated a stable performance over prolonged periods of time.

EXAMPLE 6

A viscous material was obtained in the same way as described in Example 4 except Fe$_2$O$_3$ was used as an active component instead of TiO$_2$ in a ratio Ti:Fe of 95:5 and 5% by weight of MoO$_3$ was added as a binder.

The obtained viscous material was spread on a metallic wire net of 100 mesh and pressed by a mill. After that, an obtained catalyst plate was dried and finally calcined. A calcined catalyst plate was subjected to a peeling test.

According to a test result, a peeling rate was 0.8% by weight. It was extremely small.

EXAMPLE 7

A viscous material was obtained in the same way as described in Example 4 except WO$_3$ was used as an active component instead of TiO$_2$ in a ratio Ti:Fe of 95:5 and 5% by weight of MoO$_3$ was added as a binder.

The obtained viscous material was spreaded on a metallic wire net of 200 mesh and pressed by a mill. After that, the obtained calaytic plate was dried and calcined. A calcined catalyst plate was subjected to a peeling test. According to a test result, a peeling rate was 0.8% by weight. It was extremely small.

COMPARISON 1

A viscous material was obtained in the same way as described in Example 4 except 10% by weight of almina sol was used. A calcined product was obtained in the same way as described Example 4 by using the obtained viscous material.

According to a test result on the sintered product, a peeling rate was 65% by weight. It became apparent that the adhesive performance was very bad in comparison to that of Examples 4, 5, 6 and 7.

EXAMPLE 8

Metatitanic acid TiO (OH)$_2$ slurry was mixed and kneaded by a kneader, was dried at a temperature of 150° C. for one day and calcined at a temperature of 400° C. for two hours. The obtained oxidized titanium 1 kg, molybdic acid ammonium 43 g and copper nitrate 428 g were mixed and kneaded on addition of 1 kg of water under heating. The obtained contents were dried at a temperature of 150° C. and pulverized to a granular size less than 60 mesh by a pulverizer and precalcined at temperatures of 500°±20° C. for three hours.

150 ml of water was added to the obtained powder, and mixed and kneaded by a kneader for three hours, so that a viscous material was obtained. The viscous material was extruded in a columnar shape with a diameter 4 mm by a extruding machine. The obtained pellets were dried at a temperature of 150° C. for one day and calcined at a temperature of 400° C. for two hours. The obtained composition had contained 87% of TiO$_2$, 3% of MoO$_3$ and 10% by weight of CuO. The strength of the composition was 45 kg/pellet in a direction of the diameter.

The composition comprising TiO$_2$, MoO$_3$ and CuO was suitable to use as an adsorbing agent for adsorbing and removing sulfur dioxide and sulfur trioxide from a gas.

Chemical reactions are as follows:

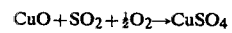

$$CuO + SO_2 + \tfrac{1}{2}O_2 \rightarrow CuSO_4$$

$$CuO + SO_3 \rightarrow CuSO_4$$

The copper oxide was active to adsorb the sulfur oxides and the oxidized molybdenum acts as a binder. The adsorption and removal of the SOx were generally made at temperatures of 350° to 450° C.

EXAMPLE 9

Ortho-titanic acid Ti (OH)$_4$ is calcined at a temperature of 400 g to form oxidized titanium. The oxidized titanium 1 kg, molybdic acid ammonium 1050 g were mixed and kneaded by a kneader on addition of water 500 ml under heating, dried at a temperature of 150° C. for one day and pulverized to form powder, which was precalcined at temperatures of 480°±20° C. for five hours. Water was added to the obtained powders by 140 ml per the powder 1 kg and a viscous material was obtained by mixing and kneading the powder by a kneader for two hours. The viscous material was made granular from a columnar shape with a diameter 1.5 mm. The obtained granulars were dried at a temperature of 150° C. for one day and calcined at a temperature of 450° C. for two hours, so that a sintered product was completed. The product had contained 54% of $TiO_2$ and 46% by weight of $MoO_3$.

The strength of the product was measured with a compression fracture strength instrument. The strength was 5 kg/pellet in a direction of the diameter.

The sintered product comprising the oxidized titanium and the oxidized molybdenum in this example had the performance to adsorb and remove hydrogen sulfide in a gas. A chemical reaction formula for the adsorption is as follows:

$$MoO_3 + H_2S = MoO_2S + H_2O$$

The adsorption was effected at temperatures of 80° to 180° C.

The adsorber was easily regenerated by treating with a gas containing oxygen and repeatedly used for adsorbing the hydrogen sulfide.

The oxidized molybdenum not only adsorbed the hydrogen sulfide but also acted as a binder.

What is claimed is:

1. A method for sintering oxidized titanium and an active catalytic or adsorbent component with oxidized molybdenum as a binder for the oxidized titanium, comprising the steps of:

depositing vaporized oxidized molybdenum on oxidized titanium powder in an atmosphere of molybdenum vapor at temperatures of 460° to 650° C., forming a powdery mixture comprising the oxidized titanium powders having the deposited oxidized molybdenum and the active catalytic or adsorbent component, adding water to the powdery mixture sufficient to make a viscous material, kneading the viscous material, shaping an article from the kneaded viscous material, and calcining the article to produce a sintered product wherein the oxidized molybdenum binds the oxidized titanium together.

2. The method of claim 1, wherein the sintered product comprises 31 to 99% by weight of oxidized titanium, at least 1% by weight of oxidized molybdenum and 1 to 69% by weight of the active component containing the oxidized molybdenum.

3. The method of claim 1, wherein the sintered product comprises 31 to 99% by weight of oxidized titanium 1 to 20% by weight of oxidized molybdenum, and 1 to 69% by weight of the active catalytic or adsorbent component containing the oxidized molybdenum.

4. The method of claim 1, including heating a titanium compound to form the oxidized titanium prior to said step of depositing.

5. The method of claim 4, wherein the titanium compound is titanic acid.

6. The method of claim 1, including heating a molybdenum compound to form the oxidized molybdenum prior to said step of depositing.

7. The method of claim 6, wherein the molybdenum compound is either molybdic acid or ammonium molybdate.

8. The method of claim 1, wherein an oxidized titanium or titanium compound which forms the oxidized titanium through a heat treatment and an oxidized molybdenum or molybdenum compound which forms the oxidized molybdenum through a heat treatment are mixed with each other and heated at the temperature to deposit vaporized oxidized molybdenum on the oxidized titanium powders during said step of depositing.

9. The method of claim 1, wherein the vaporized molybdenum is introduced to a closed container to which a titanium compound is carried to deposite the vaporized oxidized molybdenum on the oxidized titanium powders during said step of depositing.

10. The method of claim 1, wherein said step of depositing is carried out at a temperature of 500° to 610° C.

11. The method of claim 1, wherein the active catalytic or adsorbent component is mixed with the oxidized titanium powders before said step of depositing of the oxidized molybdenum on the oxidized titanium powders.

12. The method of claim 1, wherein the active catalytic or adsorbent component is mixed with the oxidized titanium powder after said step of depositing of the oxidized molybdenum on the oxidized titanium powders.

13. The method of claim 12, including heat treating the active catalytic or adsorbent component before the mixing with the oxidized titanium powders.

14. The method of claim 1, wherein the active catalytic or adsorbent component comprises one or more than one selected from the group consisting of $V_2O_3$, $Fe_2O_3$, $WO_3$, $Co_2O_3$, $NiO$, $Cr_2O_3$, $CeO_2$, $SnO_2$, $CuO$, $MoO_3$, Pt, Pd, Rh, Ru, Ir and Re.

15. The method of claim 1, 2, 3, 4, 5 or 7, wherein in said step of adding, the water is added in the range of 13 to 35% by weight.

16. The method of claim 1, 2, 3, 4, 5 or 7 wherein in said step of adding, the water is added in the range of 20 to 30% by weight, and a honeycomb structure is shaped with the viscous material during said step of shaping.

17. The method of claim 1, 2, 3, 4, 5 or 7, wherein in said step of adding, the water is added in the range of 20 to 30% by weight, and the viscous material is spread on a wire net during said step of shaping.

18. The method of claim 1, 2, 3, 4, 5 or 7, wherein in said step of adding, the water is added in the range of 25 to 35% by weight, and the viscous material is spread on a plate during said step of shaping.

19. The method of claim 1, 2, 3, 4, 5, or 7, wherein in said step of adding, the water is added in the range of 13 to 30% by weight, and the viscous material is formed in a shape of a pellet during said step of shaping.

20. A sintered product made by the process of:

first depositing vaporized, oxidized molybdenum on oxidized titanium powder in an atmosphere of molybdenum vapor at temperatures of 460° to 650° C., then forming a powdery mixture comprising the oxidized titanium powders having the deposited oxidized molybdenum and an active catalytic or adsorbent component, then adding water to the powdery mixture sufficient to make a viscous material, then kneading the viscous material, then shaping an article from the kneaded viscous material, and finally calcining the article to produce a sintered product wherein the oxidized molybdenum binds the oxidized titanium together.

21. The sintered product of claim 20, wherein the oxidized molybdenum comprises 1 to 20% by weight.

22. The sintered product of claim 20, wherein the active component comprises one or more than one selected from the group consisting of $V_2O_3$, $Fe_2O_3$, $WO_3$, $Co_2O_3$, NiO, $Cr_2O_3$, $CeO_2$, $SnO_2$, CuO, $MoO_3$, Pt, Pd, Rh, Ru, Ir and Re.

23. The sintered product of claim 20, wherein the sintered product comprises 31–99% by weight of oxidized titanium.

24. The sintered product of claim 20, wherein the sintered product comprises 1–69% by weight of active catalytic or adsorbent component, containing at least 1% by weight of oxidized molybdenum as a binder for the vaporized, oxidized molybdenum being deposited on the oxidized titanium granules.

* * * * *